US007710832B2

(12) United States Patent
Forstall et al.

(10) Patent No.: US 7,710,832 B2
(45) Date of Patent: May 4, 2010

(54) USER INTERFACES FOR ELECTRONIC CALENDAR SYSTEMS

(75) Inventors: Scott Forstall, Mountain View, CA (US); Manuel Colom, Paris (FR)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 11/761,188

(22) Filed: Jun. 11, 2007

(65) Prior Publication Data
US 2008/0304367 A1   Dec. 11, 2008

(51) Int. Cl.
G04G 11/00   (2006.01)
(52) U.S. Cl. .......................... 368/29; 708/112
(58) Field of Classification Search ............. 368/28–29; 708/111–112
See application file for complete search history.

(56) References Cited

U.S. PATENT DOCUMENTS

2007/0147178 A1 *   6/2007   Masuda et al. ................. 368/29

2007/0159927 A1 *   7/2007   Brush et al. ................... 368/29
2008/0168396 A1 *   7/2008   Matas et al. ................. 715/840

OTHER PUBLICATIONS

Microsoft Outlook 2003 User Manual :: it.med.miami.edu/documents/outlook_2003_guide.pdf; Dec. 27, 2005.*
Internet Archive Wayback Machine :: web.archive.org/web/*/http://it.med.miami.edu/documents/outlook_2003_guide.pdf; Aug. 9, 2008.*
web.archive.org/web/*/http://www.cambridgecollege.edu/download/OutlookUserguidesStaffUse.pdf; Sep. 14, 2006.*

* cited by examiner

Primary Examiner—Renee S Luebke
Assistant Examiner—Sean Kayes
(74) Attorney, Agent, or Firm—Blakely, Sokoloff, Taylor & Zafman LLP

(57) ABSTRACT

Methods, systems and machine readable media for operating a calendar in a data processing system. In one exemplary method, a calendar interface is displayed on a device, wherein the calendar interface is capable of zooming between a first or current time frame and a target time frame containing an invitation while preserving contextual continuity for the user.

52 Claims, 12 Drawing Sheets

USER INTERFACES FOR ELECTRONIC CALENDAR SYSTEMS

BACKGROUND OF THE INVENTION

The present invention relates to methods for processing data, such as data in an electronic calendar.

As electronic devices become more prevalent in society, the number of people utilizing electronic calendaring applications has increased dramatically. As consumers continue to use these electronic devices for their time and date tracking needs, problems arising from the fundamental differences between how human beings absorb data and how electronic systems deliver data will continue to exist.

Simple attempts to emulate the behavior of a traditional calendar on an electronic system often leave the users of these electronic devices confused, as the emulation does not accommodate the human users as well as the traditional system.

SUMMARY OF THE DESCRIPTION

At least certain embodiments of the present invention are directed towards an improved technique for maintaining contextual continuity within a calendaring application. Contextual continuity may be understood as providing the user with a sense of where the date of an invitation falls with respect to the date currently being viewed in a calendaring application by providing a readily understood transition between the date of the invitation and the currently viewed date (or other date).

A method of an embodiment of the invention may include: displaying a first portion of an electronic calendar, wherein the first portion is in a display area and represents a first time unit; receiving an invitation comprising a target data; displaying a first animation comprising at least one of scaling and panning the first portion until an intermediate portion is in the display area, wherein the intermediate portion comprises the first portion and the target portion; displaying a second animation comprising at least one of scaling and panning of the intermediate portion until the target portion is in the display area, wherein the target portion comprises the target date and represents a second time unit; and displaying an image representing the invitation on the target portion. The first animation may allow a user to perceive a transition from a first portion (which may show a current date or other date being displayed) to an intermediate portion which shows both the first portion and an intermediate portion. The second animation may allow a user to perceive a transition from the intermediate portion to the target portion.

In certain embodiments, the intermediate portion may be displayed without any animation. For example, in an embodiment of the inventions, a method may include displaying a first portion, which includes a first date, of an electronic calendar, receiving an invitation which comprises a target date and, in response to the receiving, displaying an intermediate portion which includes the first date and the target date and, after displaying the intermediate portion, displaying a second portion of the electronic calendar, wherein the second portion includes the target date. The intermediate portion may display a larger time frame than the first portion in order to show both the first date and the target date. For example, the first portion may be a single month view, and the second portion may be a simple month view (of a different month than in the first portion), and the intermediate portion may be in this case a multiple-month view (e.g. a year view).

One exemplary embodiment of the present invention is related to a method for processing data comprising a calendaring program and a user interface wherein a user interface provides contextual continuity while viewing and interacting with invitations. Exemplary machine readable media of the invention and exemplary systems embodying the invention are also described.

BRIEF DESCRIPTION OF THE DRAWINGS

Embodiments of the present invention will now be described by way of further only and with reference to the accompanying drawings, in which.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to provide an explanation without undue detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc. 2007.

Figure 11:
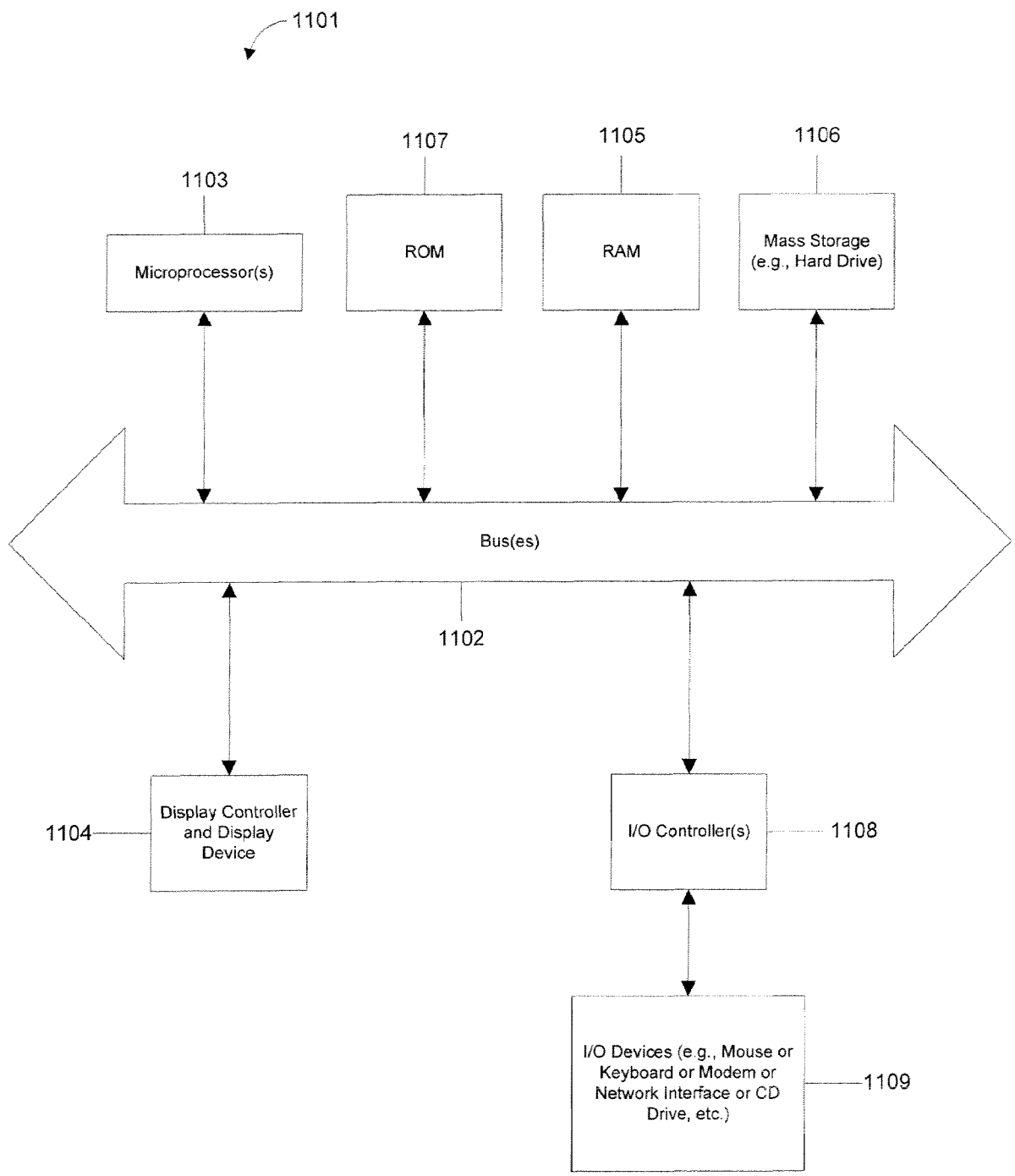
FIG. 11 shows an example of a data processing system which may be used with at least certain embodiments of the invention.

FIG. 11 shows one example of a typical data processing system, such as a computer system, which may be used with the present invention. Note that while FIG. 11 illustrates various components of a computer system, it is not intended to represent any particular architecture or manner of interconnecting the components as such details are not germane to the present invention. It will also be appreciated that personal digital assistants (PDAs), cellular telephones, entertainment systems, media players (e.g. an ipod), embedded systems containing a data processing system, network computers, consumer electronic devices and other data processing systems which have fewer components or perhaps more components may also be used with the present invention. The computer system of FIG. 11 may, for example, be a Macintosh computer from Apple Inc.

As shown in FIG. 11, the computer system 1101, which is a form of a data processing system, includes a bus 1102 which is coupled to a microprocessor(s) 1103 and a ROM (Read Only Memory) 1107 and volatile RAM 1105 and a non-volatile memory 1106. The microprocessor 1103 may be a microprocessor from Intel or may be a G3 or G4 microprocessor from Motorola, Inc. or one or more G5 microprocessors from IBM. The bus 1102 interconnects these various components together and also interconnects these components 1103, 1107, 1105, and 1106 to a display controller and display device 1104 and to peripheral devices such as input/output (I/O) devices which may be mice, keyboards, modems, network interfaces, printers and other devices which are well known in the art. Typically, the input/output devices 1109 are coupled to the system through input/output controllers 1108. The volatile RAM (Random Access Memory) 1105 is typically implemented as dynamic RAM (DRAM) which requires power continually in order to refresh or maintain the data in the memory. The mass storage 1106 is typically a magnetic hard drive or a magnetic optical drive or an optical drive or a DVD RAM or other types of memory systems which maintain data (e.g. large amounts of data) even after power is removed from the system. Typically, the mass storage 1106 will also be a random access memory although this is not required. While FIG. 11 shows that the mass storage 1106 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1102 may include one or more buses connected to each other through various bridges, controllers and/or adapters as is well known in the art. In one embodiment the I/O controller 1108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 1107, RAM 1105, mass storage 1106 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 1103.

Figure 1:
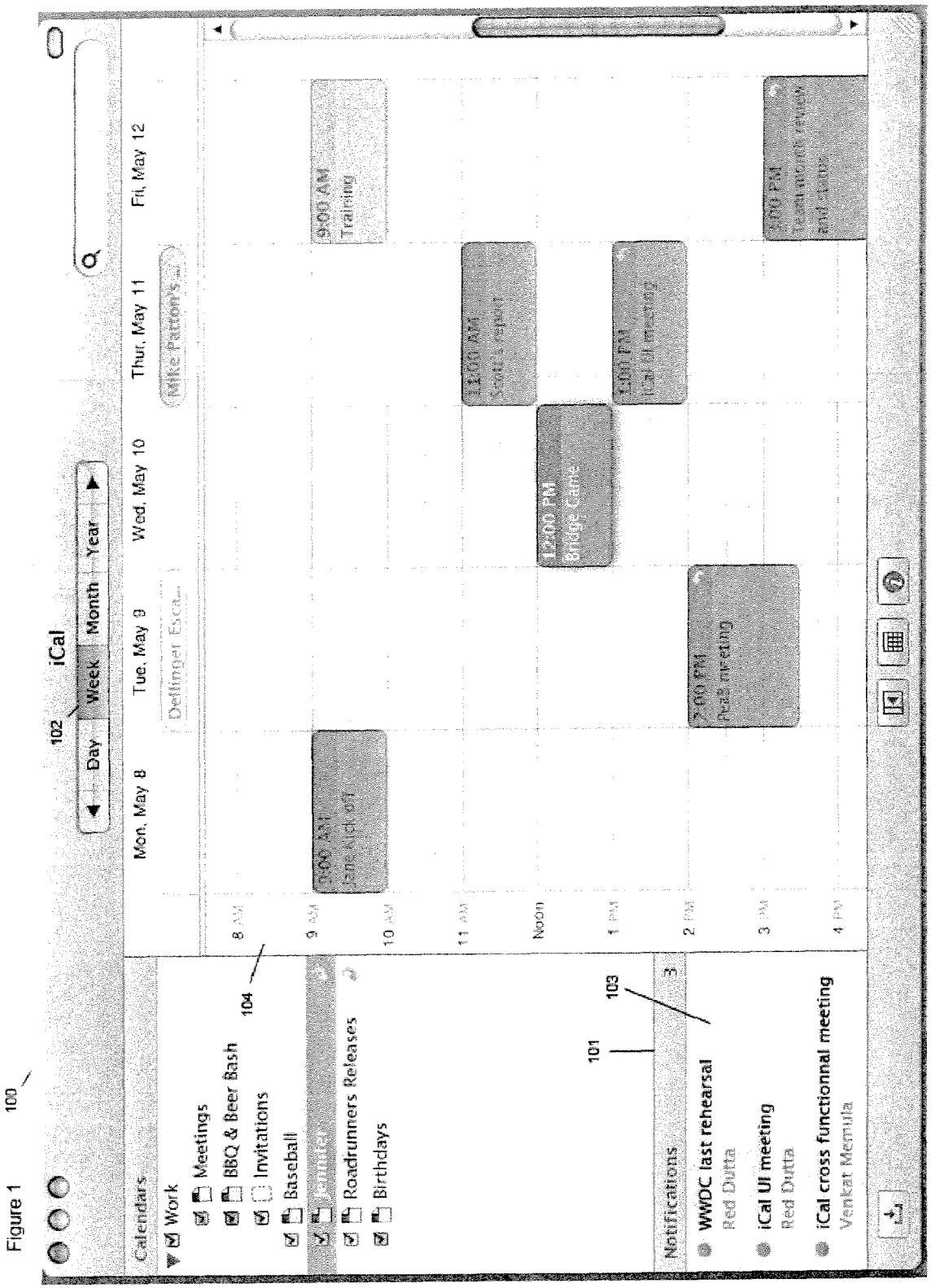
FIG. 1 shows an exemplary embodiment in which a user has been notified of an invitation.

In certain embodiments, a user interface 100, shown in FIG. 1, is displayed to the user. Interface 100 contains, for example, a list of notifications 101 which informs the user of invitations they have received. In certain exemplary embodiments, an additional interface component (not pictured) can be used to cause list of notifications 101 to be displayed. In another exemplary embodiment, an additional interface component indicates the existence of notifications without further detail.

Also visible in the exemplary interface pictured in FIG. 1 is a time unit indicator 102 which informs the user of their current time unit. For example, in FIG. 1, the current time unit is a week. In other embodiments, the current time unit may be day, week, plurality of weeks, month, plurality of months, year, or plurality of years. For example, the interface pictured in FIG. 1 allows the user to select day, week, month, or year for their current time unit. In certain embodiments, the selected time unit corresponds to a particular graphical display in time view 104. Time view 104, for example, represents a week time unit with a series of rows corresponding to the hours of each day and a column corresponding to each day. In one exemplary embodiment, the current view includes within its time frame the current date, although the current view may show other dates (e.g. one month in the future or past).

Also visible in the exemplary interface pictured in FIG. 1 is a notification 103. In certain embodiments, a notification of an invitation is an element of a textual list, such as that depicted in list of notifications 101. In certain embodiments, a user clicks on notification 103 to select the notification and the corresponding invitation. The selection of an invitation may then cause an animation to show an intermediate portion and then a target portion as described herein. In the example given below, the animation begins from the view shown in FIG. 1 and proceeds to the view shown in FIG. 2 and then to the view shown in FIG. 3 and then to the view shown in FIG. 4 and finally to the view shown in FIG. 5. An alternative embodiment may not include any animation but may display the intermediate portion before displaying the target portion.

Figure 2:
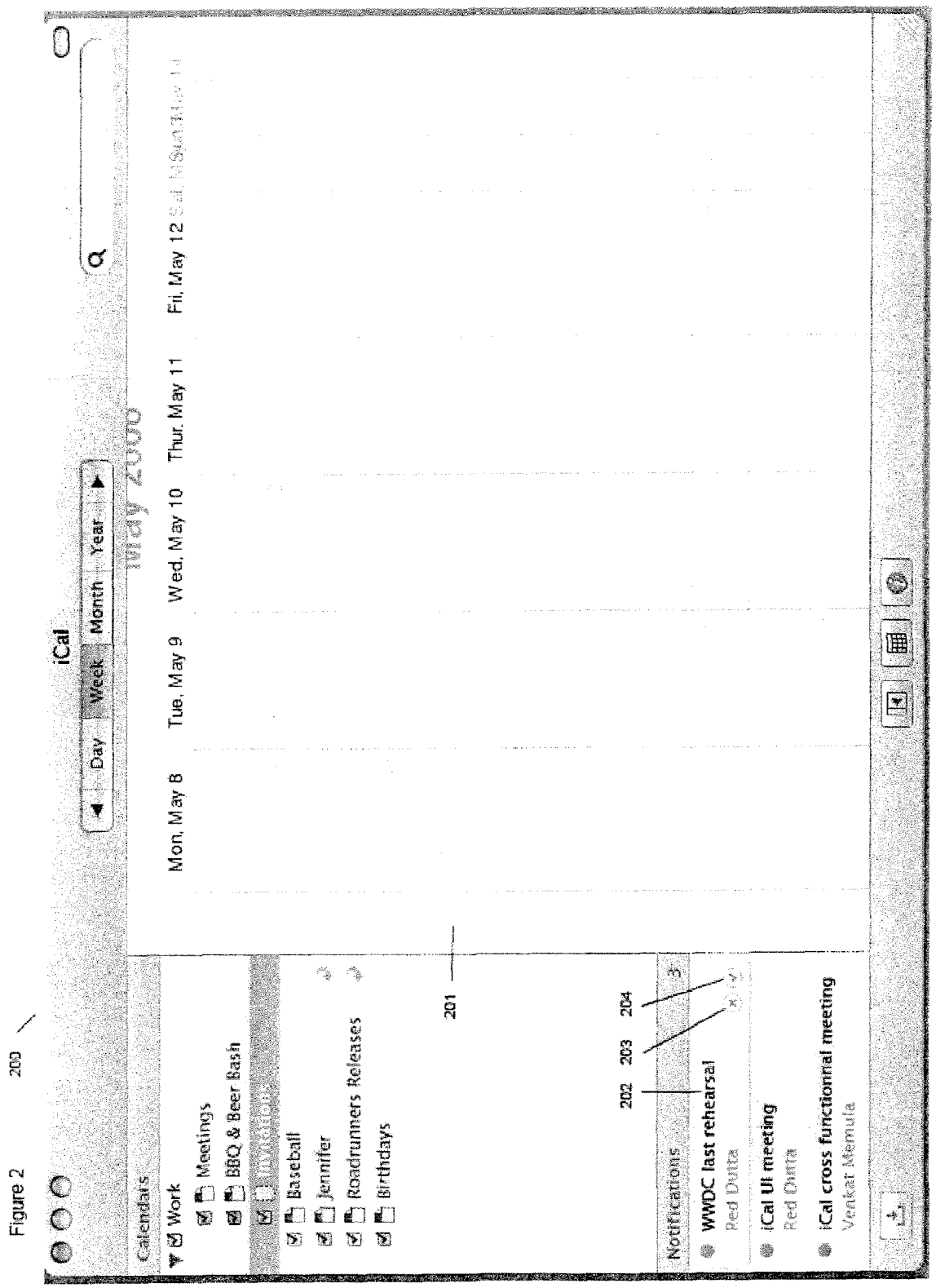
FIG. 2 shows a general example of one exemplary method of scaling from a first or current portion to an intermediate portion. Other examples may include panning or both scaling and panning.

In certain embodiments, selecting a notification such as notification 103 in FIG. 1 causes the user interface to begin changing its current time unit in an animated fashion. For example, as shown in FIG. 2, the time view from FIG. 1 has begun zooming outward to show a larger unit of time. Certain exemplary methods accomplish this zooming by scaling or panning (or both) a visual representation of a calendar. In certain embodiments, selecting a notification causes the interface to zoom out to progressively larger time units until reaching a time unit allowing the simultaneous viewing of the current view when the notification was selected and the target view containing the invitation date corresponding to the selected notification. In certain exemplary embodiments, the zooming method includes displaying a plurality of images sequentially to the user, creating an animated zooming effect. For example, in time view 201 of FIG. 2, the week view of FIG. 1 can be seen expanding vertically and horizontally to zoom from a week (in FIG. 1) to a month (in FIG. 2). In certain exemplary embodiments, interface 200 modifies selected notification 202 to indicate that it has been selected. For example, selected notification 202 has become highlighted and now contains accept button 204 and decline button 203.

Figure 3:
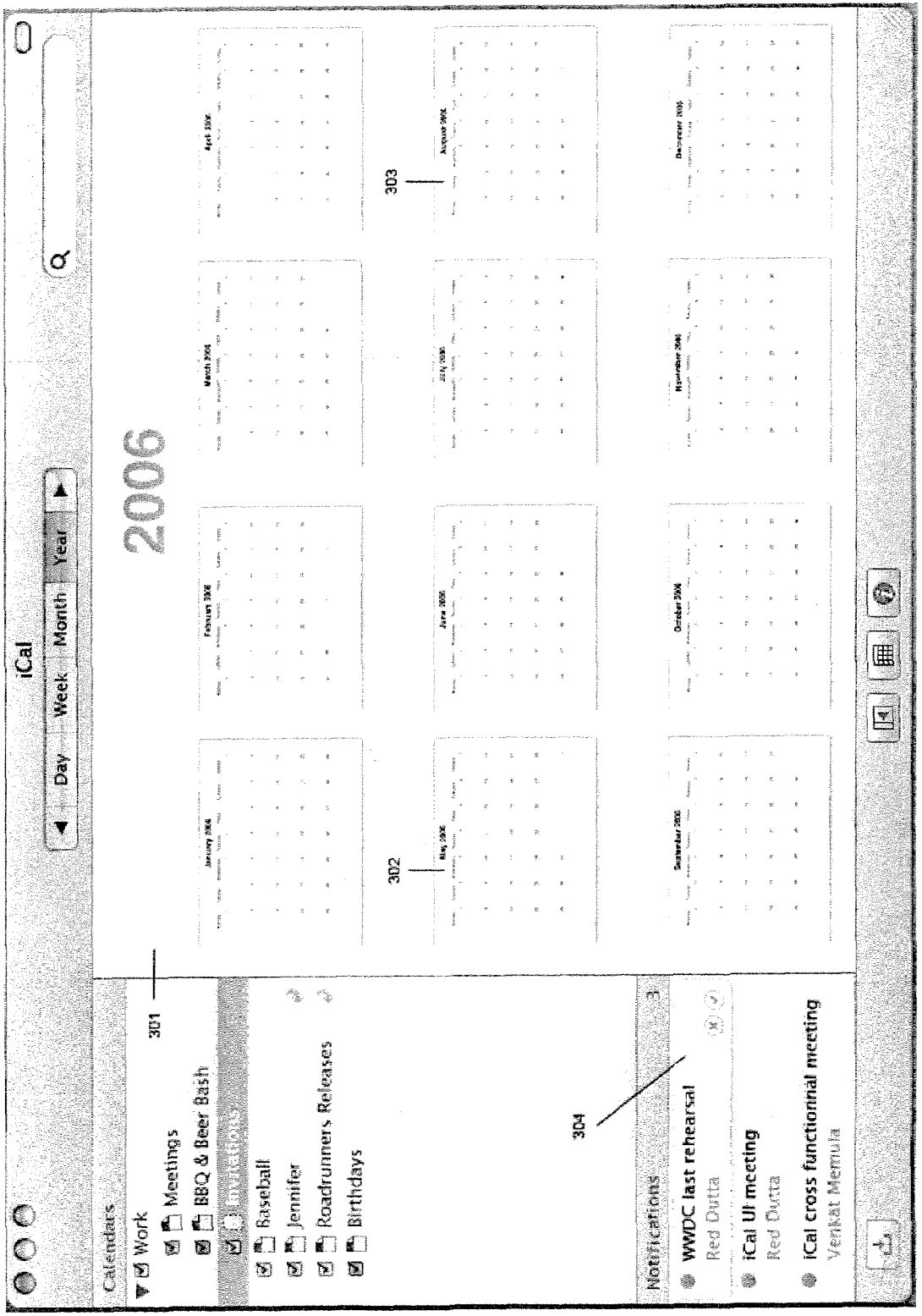
FIG. 3 shows an example of an exemplary embodiment of an intermediate portion.

FIG. 3 displays an intermediate portion of certain embodiments of an electronic calendar including both current and target portions of the calendar. For example, the user may be viewing current month 302, while notification 304 of an invitation occurring in target month 303 is selected (either by the user or by the system). In certain embodiments, maintaining contextual continuity between different current and target months uses zooming out to a time unit of year 301, which allows the user to perceive both current month 302 and target month 303. In other embodiments, a time unit for viewing different current and target portions may be a week, plurality of weeks, month, plurality of months, or years. In certain other embodiments, a visual indicator tracks the current and target dates during the panning and scaling, further enhancing the user's sense of contextual continuity.

Figure 4:
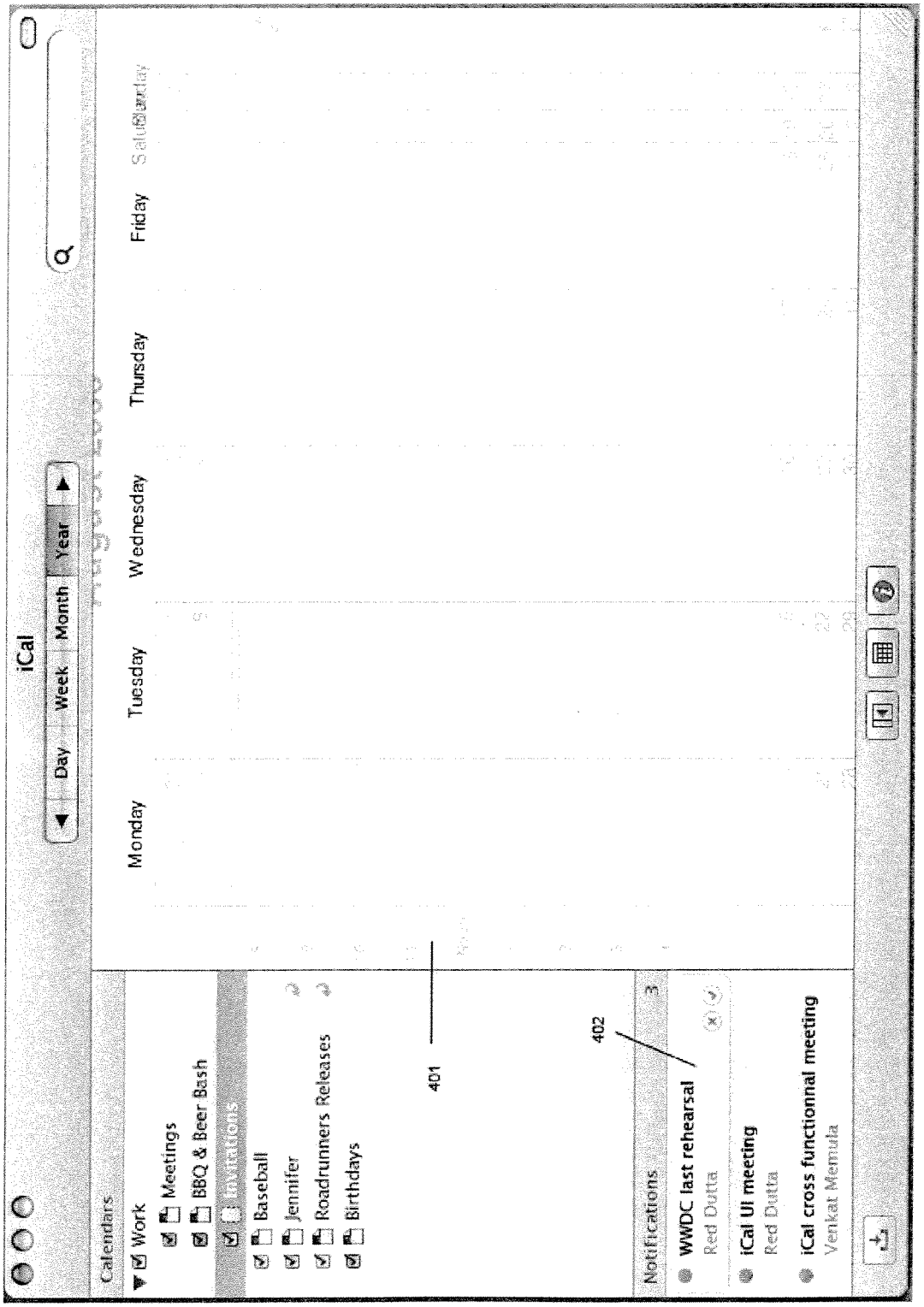
FIG. 4 shows a general example of one exemplary method of scaling from an intermediate portion to a target portion. Other examples may include panning or both scaling and panning.

In certain embodiments, when the zoom beginning in FIG. 2 reaches its apex as shown in FIG. 3, the zooming automatically, without any user input, reverses and pans itself over to the target date in the invitation related to notification 402 shown in interface 400 of FIG. 4 (the notification 402 corresponds to and is the same notification, for an invitation, as notifications 202 and 304 in FIGS. 2 and 3 respectively). In certain embodiments, time view 401 steadily increases its zoom until the target date is viewed using the same time unit being used in FIG. 1. In certain embodiments, the zooming in to the target date is accomplished by contracting horizontally and vertically the visible time unit into the desired time unit. For example, FIG. 4 shows time view 401 expanding the desired time unit of a week from the week containing the target date. The portion of the display screen taken up by the desired week steadily grows while the remainder of the current time unit, in this example, a month, shrinks in size. In certain embodiments, a meaningful zooming between time units is accomplished in this manner. In one exemplary embodiment, the zooming from apex to target portion does not occur until a condition is satisfied. For example, user input may satisfy the condition, and zooming in will follow in response to the user input. Alternatively, the condition may be satisfied after a certain time period has elapsed.

Figure 5:
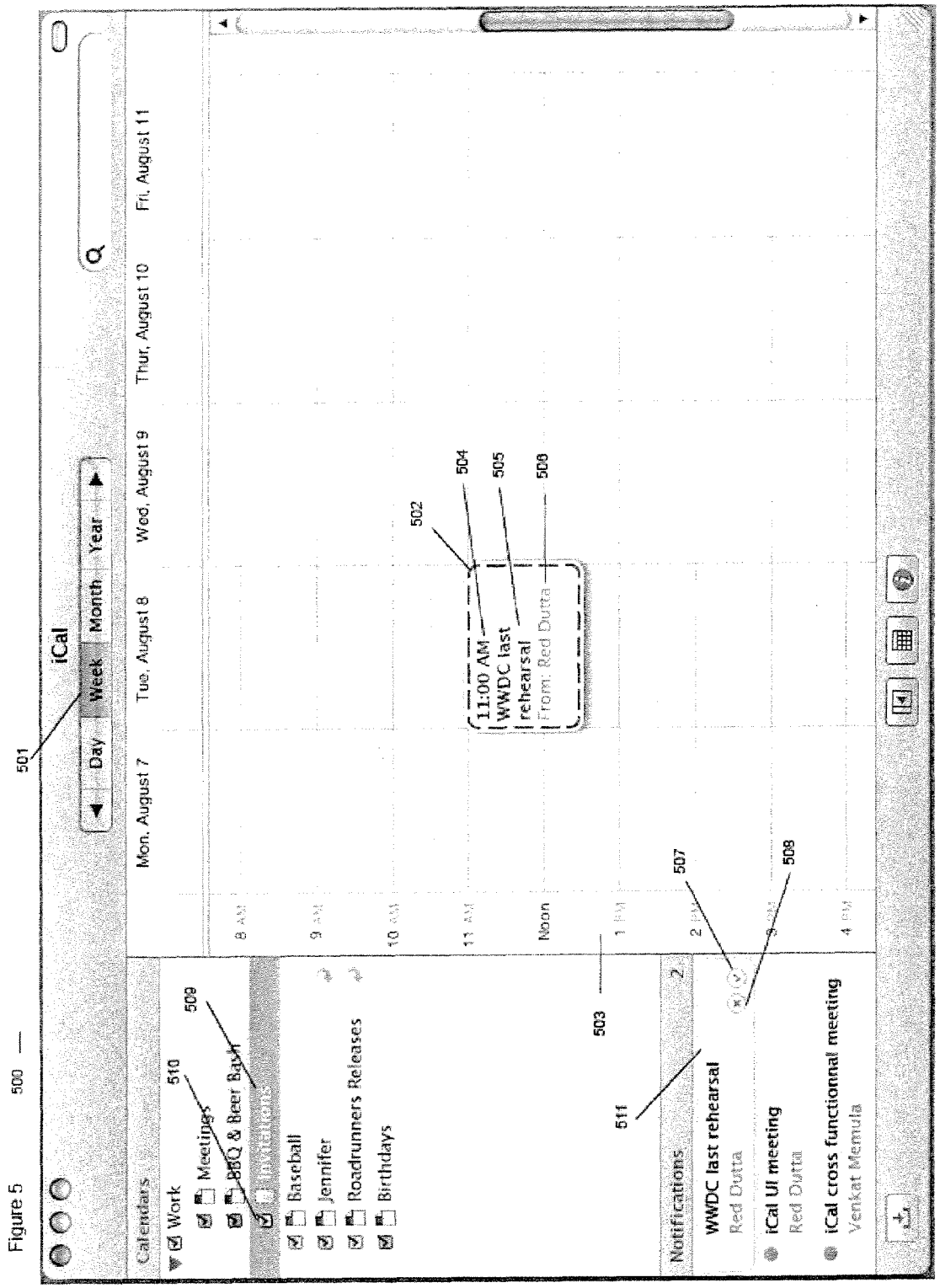
FIG. 5 shows an exemplary embodiment of a target portion displaying an invitation.

In certain exemplary embodiments, the interface in FIG. 5 is displayed after a notification has been selected and the corresponding zooming out (e.g. as shown in FIGS. 2 and 3) and zooming in (as shown in FIGS. 4 and 5) has been completed. Time unit 501 indicates that the time unit of time view 503 is a week, the same as time view 104 in FIG. 1. In FIG. 5, the current portion of the display visible in FIG. 1 has transitioned to the target portion of the display visible in time view 503. In certain embodiments, the time units of the current portion and the target portion are not the same after zooming is complete. In certain exemplary embodiments, an image representing the invitation is displayed on the target portion. In FIG. 5, for example, invitation 502 is displayed on time view 503 of interface 500. In certain exemplary embodiments, the invitation may include a title, a duration, a start time, a list of attendees, and a sender or any combination of a subset of these items. For example, invitation 502 displays start time 504, title 505, and sender 506. In certain embodiments, invitation 502 has a dashed-line border to indicate that the invitation is not yet accepted or declined. In other embodiments, different graphical attributes are used to indicate whether an invitation is accepted, declined, or neither. In certain embodiments, accept button 507 and decline button 508 can be used to change the status of the invitation to either accepted or declined. In certain embodiments, an accept button and a decline button can be located on the invitation 502 rather than on the notification 511, or elsewhere (e.g.: pop up window, overlay controls inside time view, etc.).

Figure 6:
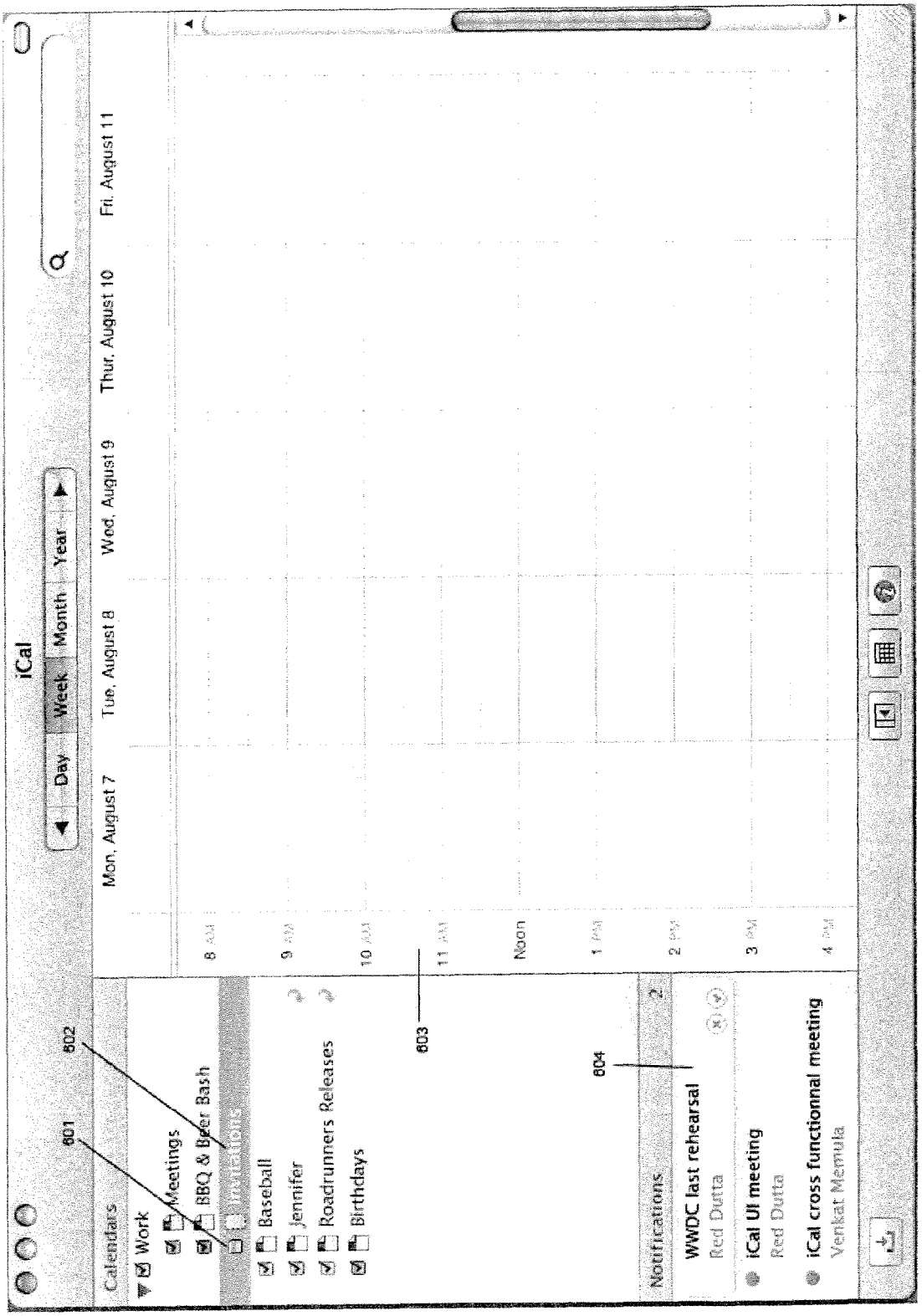
FIG. 6 shows an exemplary embodiment of a portion being displayed while an invention calendar is not selected.

In certain exemplary embodiments the invitation represented by invitation 502 corresponds to an invitations calendar 509. For example, when checkbox 510 is selected, invitations corresponding to invitations calendar 509 are displayed on time view 503, such as in invitation 502. In certain embodiments, the user or the system may select an option to not display invitations on the calendar, and FIG. 6 shows an example of this. When checkbox 601 in FIG. 6 is unselected, invitations corresponding to invitations calendar 602 are not displayed in time view 603. Notification 604 and its corresponding invitation remain in the system, but are not displayed until checkbox 601 is selected.

Figure 7:
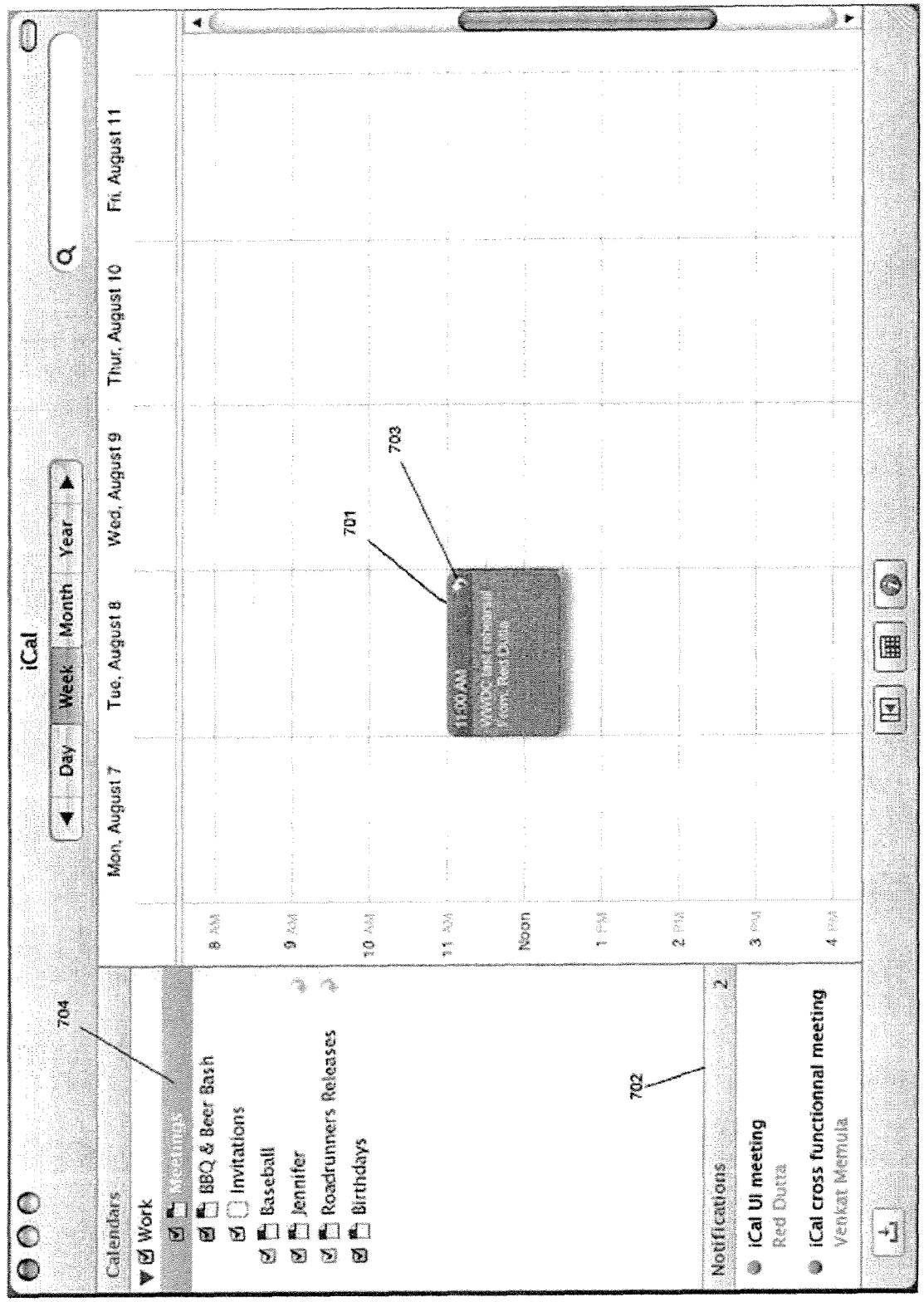
FIG. 7 shows a general example of an exemplary user interface of an accepted invitation.

In certain embodiments, the user can select the accept button 507 to accept the invitation corresponding to notification 511. For example, FIG. 7 pictures interface 700 after accept button 507 has been selected by the user. In certain embodiments, the invitation 701 has become filled with color to indicate that the invitation has been accepted. In this example the color used is the default invitations collector calendar 704 tag color, as the invitation 502 has turned into a new event 701 belonging to the collector calendar 704. In certain embodiments an indication 703 can remain on the new event in order to identify events that emanate from invitations from those created by the user. In other embodiments, notification 511 has been removed from notification list 702, indicating that the invitation corresponding to notification 511 has been accepted or declined.

Figure 8A:
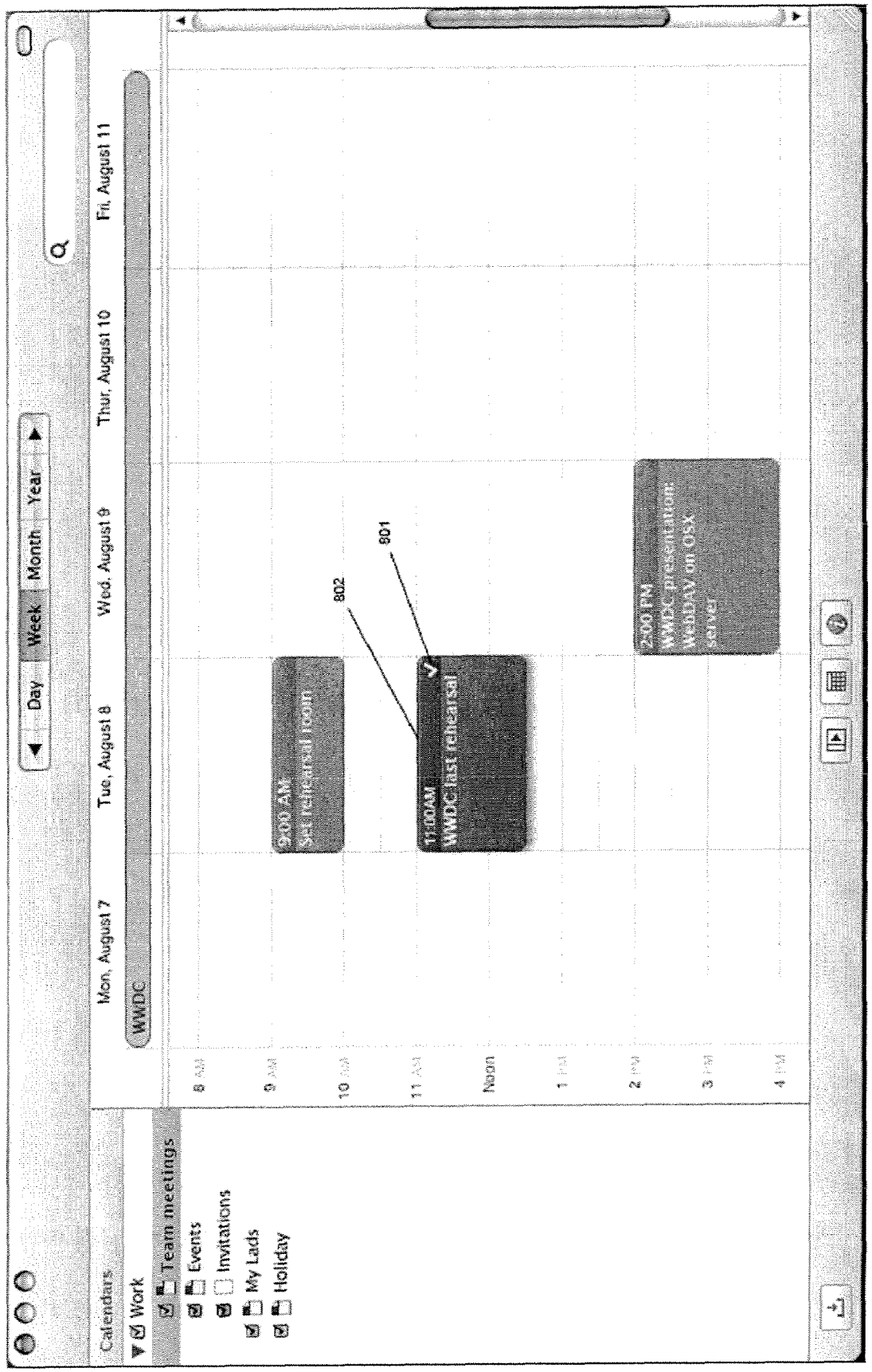
FIG. 8a shows a general example of an exemplary user interface of a sender notification.
Figure 8B:
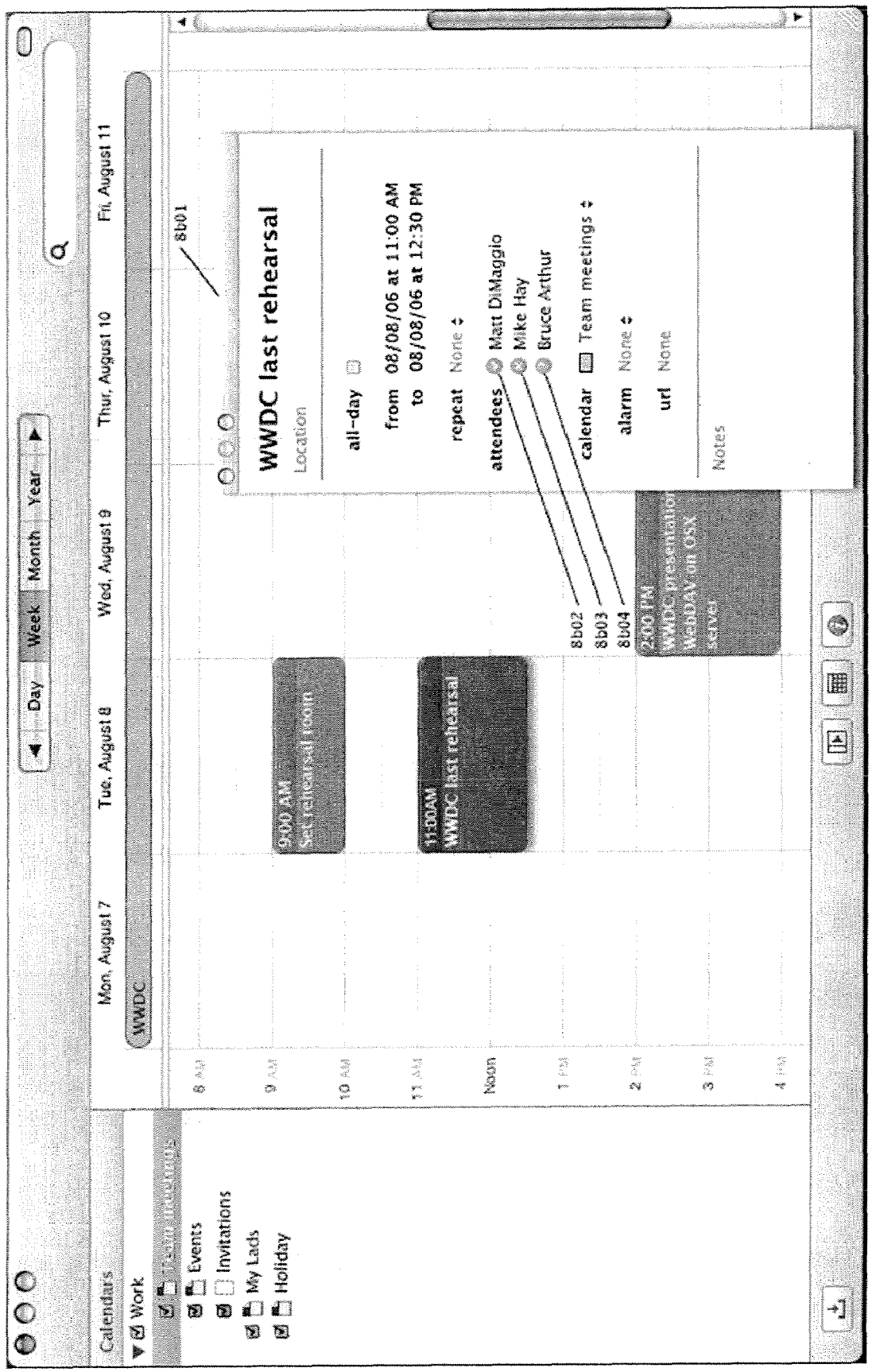
FIG. 8b shows another example of a user interface of a sender notification.

In certain embodiments, accepting an invitation, such as the invitation corresponding to invitation 701, sends a message to the invitation's sender which in turn may display an indication that the invitation has been accepted. For example, FIG. 8*a* shows an invitation which has been accepted. FIG. 8*a* shows an example of a user interface of an electronic calendar of the sender of the invitation 701 (which corresponds to the notification 604). The sender's version of this invitation is shown as invitation 802, and invitation 802 includes an indication 801 (a check mark, in this example) that the recipient of the invitation has accepted the invitation if there is one recipient, or that all recipients have accepted the invitation if there are several. Certain embodiments can provide a list of all recipients and their invitation status as shown in FIG. 8*b* (accepted 8*b*02, declined 8*b*03 or 8*b*04 pending) using an information or inspector panel 8*b*01. Other embodiments can show a new notification inside the notification list 702 on the sender's side each time a recipient accepts or declines the invitation.

Certain embodiments of the invention may not include any animation, such as the animation represented by FIGS. 2 and 4, but may still provide a way to provide a context between the invitation date and currently viewed date. For example, a context may be provided by displaying an intermediate portion (showing both a first portion and a target portion) before displaying a target portion (without showing concurrently the first portion). In this example, a notification of an invitation, such as notification 103, may be received by a data processing system of a recipient of the invitation, and this data processing system may be, at the time of the receipt, displaying a currently viewed portion (e.g. a first portion) of an electronic calendar. The notification may be selected either by a user or by the system (e.g. an automatic selection by the system), and in response to the selection, an intermediate portion of the electronic calendar may be displayed. The intermediate portion would normally include the first portion and a target portion which includes the target date of the invitation. The system would then display the target portion which would not normally include the currently viewed portion (unless the time unit of the target portion is large enough to include both when the target portion is displayed). An example of this particular sequence may include displaying the user interface of FIG. 1 (e.g. showing a first portion) and then momentarily displaying the user interface of FIG. 3 (which is showing an intermediate portion that includes both the first portion which was currently viewed and the target portion) and then displaying the user interface of FIG. 5 which shows the target portion. This sequence may occur without the intervening animation represented by FIGS. 2 and 4. It will be appreciated that alternative sequences may be used, such as displaying the intermediate portion after displaying the target portion or displaying the intermediate portion only upon a selection of a command to display the intermediate portion, etc.; these alternative sequences can still provide sufficient context through the use of the intermediate portion, with or without panning, scaling and/or zooming.

Figure 9:
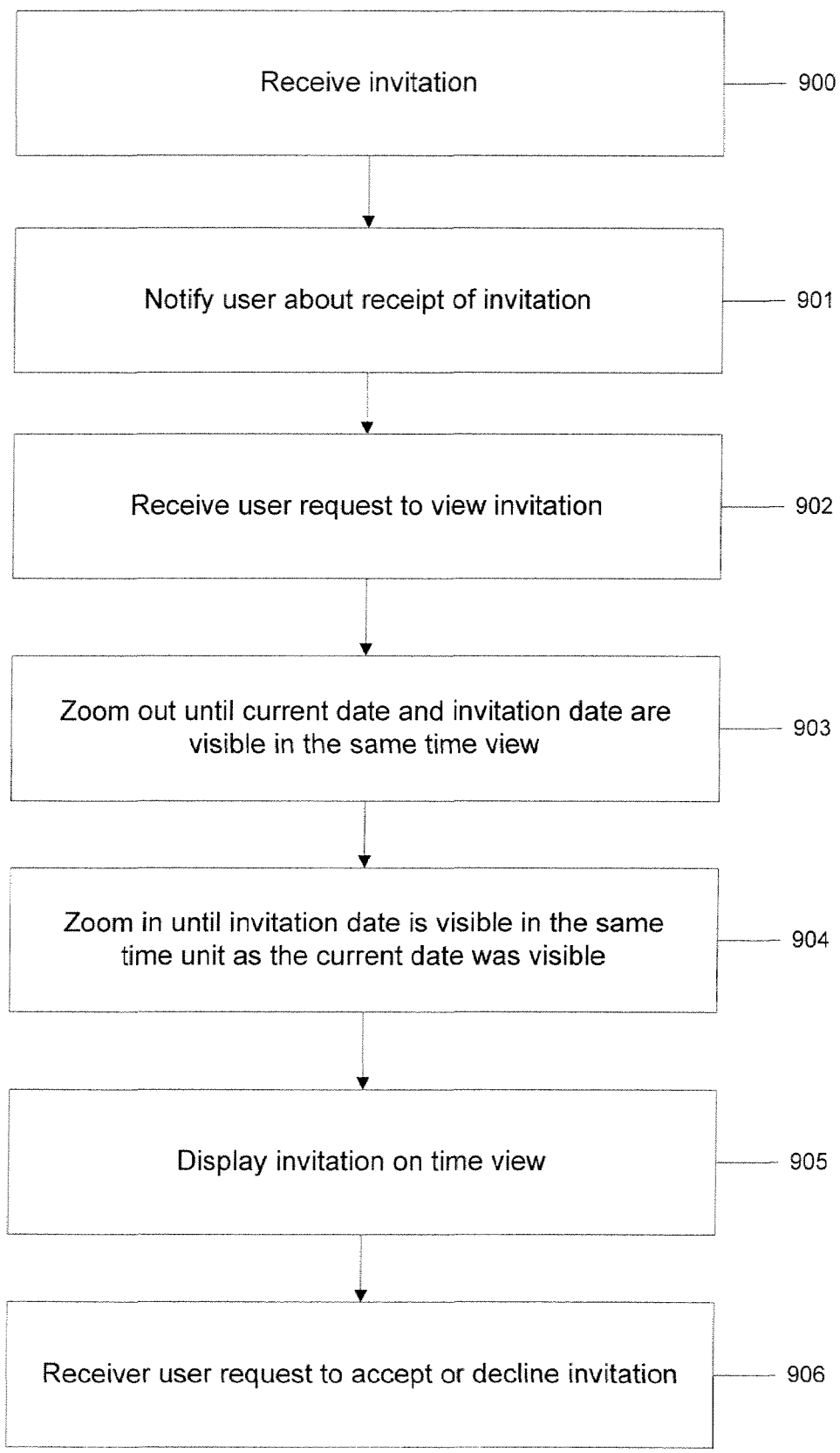
FIG. 9 is a flowchart demonstrating a exemplary embodiment of the present invention.

FIG. 9 describes one implementation of an exemplary method of the present invention. In operation 900, the calendaring program receives an invitation sent to the user. In operation 901, the calendaring system notifies the user of the invitation. In certain exemplary embodiments, various user interface elements provide this notification, such as the dock in Macintosh O/S X or the system tray in Windows XP or a portion of a window controlled in part by a calendar application program. In operation 902, the calendaring system receives a request from the user to view the invitation. In certain embodiments, this request originates with selecting a user interface component in the calendaring program. In other embodiments, the request originates with user input outside the user interface of the calendaring program or it originates automatically under machine control. In operation 903, the calendaring program zooms out to an intermediate time view including the currently viewed date and the target date of the invitation in the same time view. In certain embodiments, the current, intermediate, and target time units may be days, weeks, pluralities of weeks, months, pluralities of months, years, or pluralities of years. It will be appreciated that the currently viewed date may not actually be displayed but rather is stored as the last location in the calendar accessed or saved by a user's interaction with the calendar.

In certain embodiments, operation 903 does not transition to operation 904 until a condition is satisfied. For example, the condition may be satisfied when an amount of time has elapsed or a user input has been received. In other embodiments, operation 904 scales and/or pans the time view to center and zoom into the target date of the invitation. In certain embodiments, this and other zooming, panning, and scaling is represented by a sequential series of images presented to the user. In other embodiments, the time view displays the target date using the same time unit as was used in the current portion. In other embodiments, the current and target time units are different.

In certain exemplary embodiments, operation 905 displays an image corresponding to the invitation on the time view. In certain embodiments, the image of the invitation possesses graphical attributes which indicate that the invitation has not been accepted or declined by the user. In other embodiments, in operation 906 the method receives a user request to accept or decline an invitation. In certain embodiments, accepting an invitation changes the graphical attributes of the image corresponding to the invitation, while declining the invitation causes the image to be removed from the calendar. In other embodiments, accepting or declining an invitation causes the method to execute again in the opposite direction, such that the target portion and current portion are transposed. In such embodiments, the zoom is reversed, with the result that the time view, after the zooming animation, is the current view originally displayed.

Figure 10:
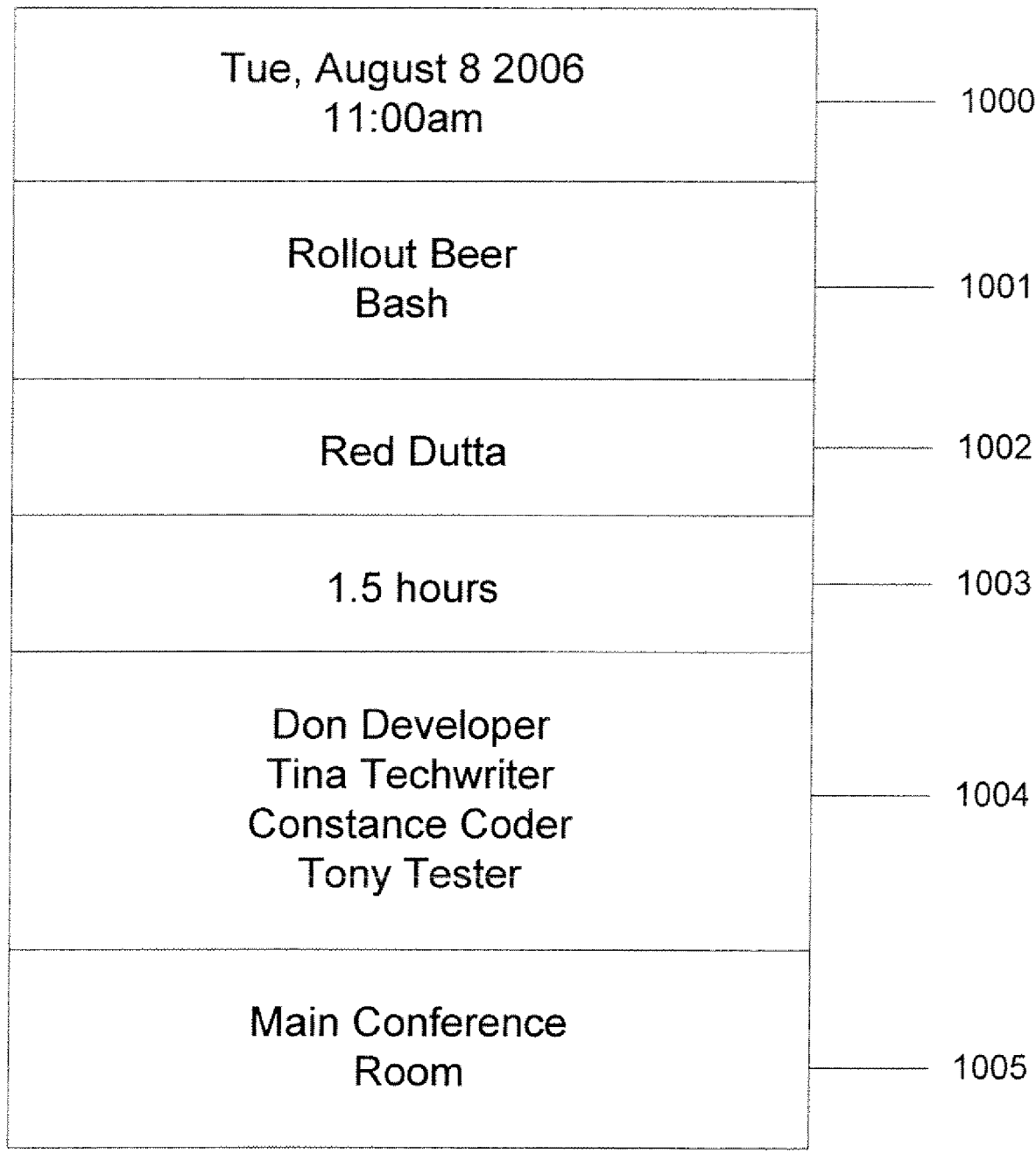
FIG. 10 shows an example of one exemplary embodiment of an invitation data structure.

FIG. 10 describes one exemplary embodiment, in which an invitation comprises target date and time 1000, title 1001, sender 1002, duration 1003, attendees 1004, and location 1005. In other embodiments, an invitation contains a subset of one or more of these elements or additional elements not shown in FIG. 10.

The foregoing description has been given by way of example only and it will be appreciated by a person skilled in the art that modifications can be made without departing from the scope of the present invention.

What is claimed is:

1. A machine implemented method of processing data comprising:
   displaying a first portion of an electronic calendar, wherein the first portion is in a display area and represents a first time unit;
   receiving an invitation comprising a target date;
   displaying, in response to receiving the invitation, a first animation comprising at least one of scaling and panning the first portion until an intermediate portion is in the display area, wherein the intermediate portion comprises the first portion and a target portion;
   displaying a second animation comprising at least one of scaling and panning the intermediate portion until the target portion is in the display area, wherein the target portion comprises the target date and represents a second time unit; and
   displaying an image representing the invitation on the target portion.

2. A method as in claim 1 wherein a time unit is selected from the group consisting of day, week, plurality of weeks, month, plurality of months, year, and plurality of years and wherein the first portion shows the current date.

3. A method as in claim 2 wherein the first time unit and second time unit are the same and the intermediate portion shows a third time unit which is larger than the first and second time units.

4. A method as in claim 2 wherein the intermediate portion represents a smallest time unit capable of concurrently displaying the first portion and the target portion.

5. A method as in claim 1 wherein the invitation further comprises a list of attendees, a title, and a sender.

6. A method as in claim 1 wherein the invitation further comprises a duration and wherein the method further comprises notifying a user of the invitation and receiving a request from the user to view the invitation.

7. A method as in claim 6 further comprising the user accepting the invitation.

8. A method as in claim 7 wherein accepting the invitation sends a message to a second user who sent the invitation.

9. A method as in claim 1 wherein the invitation further comprises a location.

10. A method as in claim 1 wherein the displaying of the image representing the invitation is performed if an invitations calendar is selected.

11. A method as in claim 10 wherein the displaying of the image representing the invitation is not performed if the invitations calendar is not selected.

12. A method as in claim 1 wherein the displaying of the second animation is not performed until a condition is satisfied.

13. A method as in claim 12 wherein the condition is satisfied by a user action.

14. A method as in claim 12 wherein the condition is satisfied when a specified period of time has elapsed following the displaying of the first animation.

15. A method as in claim 1 wherein the first portion does not comprise the current date.

16. A method as in claim 1 wherein the first animation and the second animation are pluralities of images displayed sequentially.

17. A method as in claim 1 wherein accepting the invitation causes a third animation from the target portion to the intermediate portion and causes a fourth animation from the intermediate portion to the first portion.

18. A method as in claim 1 wherein the displaying of the second animation further comprises displaying a visual indicator representing the target date.

19. A method as in claim 1 wherein the image representing the invitation comprises text, a fill color, and a rounded rectangle.

20. A machine readable medium providing instructions which when executed by a data processing system cause the data processing system to perform a method of processing data, the method comprising:
    displaying a first portion of an electronic calendar, wherein the first portion is in a display area and represents a first time unit;
    receiving an invitation comprising a target date;
    displaying, in response to receiving the invitation, a first animation comprising at least one of scaling and panning the first portion until an intermediate portion is in the display area, wherein the intermediate portion comprises the first portion and a target portion;
    displaying a second animation comprising at least one of scaling and panning the intermediate portion until the target portion is in the display area, wherein the target portion comprises the target date and represents a second time unit; and
    displaying an image representing the invitation on the target portion.

21. A medium as in claim 20 wherein a time unit is selected from the group consisting of day, week, plurality of weeks, month, plurality of months, year, and plurality of years and wherein the first portion shows the current date.

22. A medium as in claim 21 wherein the first time unit and second time unit are the same and the intermediate portion shows a third time unit which is larger than the first and second time units.

23. A medium as in claim 21 wherein the intermediate portion represents a smallest time unit capable of concurrently displaying the first portion and the target portion.

24. A medium as in claim 20 wherein the invitation further comprises a list of attendees, a title, and a sender.

25. A medium as in claim 20 wherein the invitation further comprises a duration and wherein the method further comprises notifying a user of the invitation and receiving a request from the user to view the invitation.

26. A medium as in claim 25 further comprising the user accepting the invitation.

27. A medium as in claim 26 wherein accepting the invitation sends a message to a second user who sent the invitation.

28. A medium as in claim 20 wherein the invitation further comprises a location.

29. A medium as in claim 20 wherein the displaying of the image representing the invitation is performed if an invitations calendar is selected.

30. A medium as in claim 29 wherein the displaying of the image representing the invitation is not performed if the invitations calendar is not selected.

31. A medium as in claim 20 wherein the displaying of the second animation is not performed until a condition is satisfied.

32. A medium as in claim 31 wherein the condition is satisfied by a user action.

33. A medium as in claim 31 wherein the condition is satisfied when a specified period of time has elapsed following the displaying of the first animation.

34. A medium as in claim 20 wherein the first portion does not comprise the current date.

35. A medium as in claim 20 wherein the first animation and the second animation are pluralities of images displayed sequentially.

36. A medium as in claim 20 wherein accepting the invitation causes a third animation from the target portion to the intermediate portion and causes a fourth animation from the intermediate portion to the first portion.

37. A medium as in claim 20 wherein the displaying of the second animation further comprises displaying a visual indicator representing the target date.

38. A medium as in claim 20 wherein the image representing the invitation comprises text, a fill color, and a rounded rectangle.

39. A data processing system comprising:
    means for displaying a first portion of an electronic calendar, wherein the first portion is in a display area and represents a first time unit;
    means for receiving an invitation comprising a target date;
    means for displaying, in response to receiving the invitation, a first animation comprising at least one of scaling and panning the first portion until an intermediate portion is in the display area, wherein the intermediate portion comprises the first portion and a target portion;
    means for displaying a second animation comprising at least one of scaling and panning the intermediate portion until the target portion is in the display area, wherein the target portion comprises the target date and represents a second time unit; and
    means for displaying an image representing the invitation on the target portion.

40. A machine readable medium containing executable program instructions which, when executed, cause a data processing system to perform a method comprising:
    displaying a first portion of an electronic calendar, the first portion including a first date, the first portion corresponding to a first time frame;
    receiving an invitation which comprises a target date;
    determining, in response to the invitation, a time unit large enough to allow simultaneous viewing of the first date and the target date;
    displaying an intermediate portion corresponding to an intermediate time frame based on the time unit, the intermediate portion including the first portion and a target portion including the target date;
    displaying a second portion of the electronic calendar, wherein the second portion corresponds to a second time frame and wherein the second portion includes the target date; and
    displaying a plurality of portions of the electronic calendar, the plurality of portions including a third portion and a fourth portion,
    wherein the third portion corresponds to a third time frame, the third time frame is being larger than the first time frame, and the third time frame being smaller than the intermediate time frame,
    wherein the fourth portion corresponds to a fourth time frame the fourth time frame being smaller than the intermediate time frame, fourth time frame being larger than the second time frame,
    wherein the intermediate portion includes a shrinking portion shrunk from the first portion, and
    wherein the intermediate portion includes a growing portion grown from the target portion.

41. A medium as in claim 40 wherein the second portion is displayed after displaying the intermediate portion, wherein the second portion does not include the first date, and wherein determining the time unit comprises selecting the time unit from larger time units until the allowance of simultaneous viewing of the first date and the target date.

42. A medium as in claim 41 wherein the intermediate portion displays a larger time frame than the first portion in order to show both the first date and the target date.

43. A medium as in claim 42 wherein the electronic calendar is capable of displaying a plurality of time units comprising at least two of: a day; a week; a plurality of weeks; a month; a plurality of months; a year, and a plurality of years.

44. A medium as in claim 43 wherein the intermediate portion represents a smallest time unit capable of concurrently displaying the first date and the target date.

45. A medium as in claim 43 wherein the method further comprises:
receiving an acceptance of the invitation;
displaying, in response to the acceptance, the intermediate portion and then displaying the first portion.

46. A machine implemented method comprising:
displaying a first portion of an electronic calendar, the first portion including a first date and the first portion corresponding to a first time frame;
receiving an invitation which comprises a target date;
determining, in response to the invitation, a time unit large enough to allow simultaneous viewing of the first date and the target date;
displaying an intermediate portion corresponding to an intermediate time frame based on the time unit, the intermediate p onion including the first p onion and a target portion including the target date;
displaying a second portion of the electronic calendar, wherein the second portion corresponding to a second time frame and wherein the second portion includes the target date; and
displaying a plurality of portions of the electronic calendar, the plurality of portions including a third portion and a fourth portion,
wherein the third portion corresponds to a third time frame, the third time frame being larger than the first time frame, the third time frame being smaller than the intermediate time frame,
wherein the fourth portion corresponds to a fourth time frame, the fourth time frame being smaller than the intermediate time frame, the fourth time frame being larger than the second time frame,
wherein the intermediate portion includes a shrinking portion shrunk from the first portion, and
wherein the intermediate portion includes a growing portion grown from the target portion.

47. A method as in claim 46 wherein the second portion is displayed after displaying the intermediate portion, wherein the second portion does not include the first date, and wherein determining the time unit comprises selecting the time unit from larger time units until the allowance of simultaneous viewing of the first date and the target date.

48. A method as in claim 47 wherein the intermediate portion displays a larger time frame than the first portion in order to show both the first date and the target date.

49. A method as in claim 48 wherein the electronic calendar is capable of displaying a plurality of time units comprising at least two of: a day; a week; a plurality of weeks; a month; a plurality of months; a year, and a plurality of years.

50. A method as in claim 49 wherein the intermediate portion represents a smallest time unit capable of concurrently displaying the first date and the target date.

51. A method as in claim 49 wherein the method further comprises:
receiving an acceptance of the invitation;
displaying, in response to the acceptance, the intermediate portion and then displaying the first portion.

52. A data processing system comprising:
means for displaying a first portion of an electronic calendar, the first portion including a first date and the first portion corresponding to a first time frame;
means for receiving an invitation which comprises a target date;
means for determining, in response to the invitation, a time unit large enough to allow simultaneous viewing of the first date and the target date;
means for displaying an intermediate portion corresponding to an intermediate time frame based on the time unit, the intermediate portion including the first portion and a target portion including the target date;
means for displaying a second portion of the electronic calendar, wherein the second portion corresponds to a second time frame and wherein the second portion includes the target date; and
means for displaying a plurality of portions of the electronic calendar, the plurality of portions including a third portion and a fourth portion,
wherein the third portion corresponds to a third time frame, the third time frame is being larger than the first time frame, the third time frame being smaller than the intermediate time frame,
wherein the fourth portion corresponds to a fourth time frame, the fourth time frame being smaller than the intermediate time frame, the fourth time frame being larger than the second time,
wherein the intermediate portion includes a shrinking portion shrunk from the first portion, and
wherein the intermediate portion includes a growing portion grown from the target portion.

* * * * *

UNITED STATES PATENT AND TRADEMARK OFFICE
CERTIFICATE OF CORRECTION

| | | |
|---|---|---|
| PATENT NO. | : 7,710,832 B2 | |
| APPLICATION NO. | : 11/761188 | |
| DATED | : May 4, 2010 | |
| INVENTOR(S) | : Scott Forstall et al. | |

It is certified that error appears in the above-identified patent and that said Letters Patent is hereby corrected as shown below:

In column 2, line 27, delete "invention" and insert -- invitation --, therefor.

In column 10, line 55, in Claim 40, after "frame" delete "is".

In column 10, line 59, in Claim 40, delete "frame the" and insert -- frame, the --, therefor.

In column 10, line 60, in Claim 40, delete "fourth" and insert -- the fourth --, therefor.

In column 11, line 30, in Claim 46, after "intermediate" delete "p onion" and insert -- portion --, therefor.

In column 11, line 30, in Claim 46, after "first" delete "p onion" and insert -- portion --, therefor.

In column 12, line 41, in Claim 52, after "frame" delete "is".

In column 12, line 47, in Claim 52, delete "time," and insert -- time frame, --, therefor.

Signed and Sealed this
Twenty-second Day of November, 2011

David J. Kappos
*Director of the United States Patent and Trademark Office*